(12) United States Patent
Wiggers et al.

(10) Patent No.: US 9,058,427 B2
(45) Date of Patent: Jun. 16, 2015

(54) ITERATIVE GENERATION OF SYMBOLIC TEST DRIVERS FOR OBJECT-ORIENTED LANGUAGES

(75) Inventors: Maarten Wiggers, San Jose, CA (US); Indradeep Ghosh, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 121 days.

(21) Appl. No.: 13/549,785

(22) Filed: Jul. 16, 2012

(65) Prior Publication Data
US 2014/0019939 A1    Jan. 16, 2014

(51) Int. Cl.
G06F 9/44 (2006.01)
G06F 11/36 (2006.01)

(52) U.S. Cl.
CPC .............. G06F 11/3684 (2013.01); G06F 8/30 (2013.01)

(58) Field of Classification Search
None
See application file for complete search history.

(56) References Cited

U.S. PATENT DOCUMENTS

| | | | | |
|---|---|---|---|---|
| 5,784,553 | A * | 7/1998 | Kolawa et al. | 714/38.1 |
| 6,983,451 | B2 * | 1/2006 | Colaiuta | 717/125 |
| 7,266,808 | B2 * | 9/2007 | Kolawa et al. | 717/126 |
| 8,281,286 | B2 * | 10/2012 | Nguyen | 717/125 |
| 8,359,576 | B2 * | 1/2013 | Prasad et al. | 717/124 |
| 8,423,879 | B2 * | 4/2013 | Bhatt et al. | 714/819 |
| 8,504,997 | B2 * | 8/2013 | Tkachuk et al. | 717/131 |
| 8,595,701 | B2 * | 11/2013 | Li et al. | 717/124 |
| 8,776,026 | B2 * | 7/2014 | Candea et al. | 717/126 |
| 2004/0205721 | A1 * | 10/2004 | Colaiuta | 717/124 |
| 2006/0253739 | A1 * | 11/2006 | Godefroid et al. | 714/38 |
| 2007/0033576 | A1 * | 2/2007 | Tillmann et al. | 717/124 |
| 2009/0089759 | A1 * | 4/2009 | Rajan et al. | 717/126 |
| 2010/0125832 | A1 * | 5/2010 | Prasad et al. | 717/124 |
| 2010/0242029 | A1 * | 9/2010 | Tkachuk et al. | 717/135 |
| 2012/0084759 | A1 * | 4/2012 | Candea et al. | 717/126 |
| 2012/0204154 | A1 * | 8/2012 | Li et al. | 717/124 |
| 2013/0085720 | A1 * | 4/2013 | Xie et al. | 703/1 |
| 2013/0091495 | A1 * | 4/2013 | Garg et al. | 717/131 |
| 2013/0311829 | A1 * | 11/2013 | Beskrovny et al. | 714/32 |
| 2013/0318503 | A1 * | 11/2013 | Li et al. | 717/126 |

OTHER PUBLICATIONS

Thummalapenta et al.; "MSeqGen: Object-Oriented Unit-Test Generation via Mining Source Code"; ESEC-FSE'09; pp. 10, 2009.

* cited by examiner

*Primary Examiner* — Don Wong
*Assistant Examiner* — Roberto E Luna
(74) *Attorney, Agent, or Firm* — Baker Botts L.L.P.

(57) ABSTRACT

A method includes, by one or more computing devices, determining instructions for a computing device to be evaluated, creating a first symbolic test driver including one or more of the instructions to be evaluated and a designation of a symbolic variable corresponding to a portion of the instructions, symbolically executing the instructions with respect to the symbolic variable, determining a test case from the results of the symbolic execution including one or more commands to execute the instructions with a given value for the symbolic variable, determining one or more calls to an object-oriented-programming component in the commands, creating a new symbolic test driver including the calls based on the determined calls, and subsequently symbolically executing the new symbolic test driver.

20 Claims, 5 Drawing Sheets

ITERATIVE GENERATION OF SYMBOLIC TEST DRIVERS FOR OBJECT-ORIENTED LANGUAGES

TECHNICAL FIELD

The present invention generally relates to software verification and, more particularly, to iterative generation of symbolic test drivers for object-oriented languages.

BACKGROUND

A software application may include any number of modules (e.g., classes, functions, procedures, subroutines, or code blocks), and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the test cases. In the later case, a software-testing tool, implemented as computer software or hardware, may generate test cases for a software module under test, execute the module under test while simulating the test cases, and check for module behavior or output that does not agree with the test cases. The sheer complexity of modern software often renders manual generation or design of test cases inadequate for completely testing the software.

SUMMARY

In one embodiment, a method includes, by one or more computing devices, determining instructions for a computing device to be evaluated, creating a first symbolic test driver including one or more of the instructions to be evaluated and a designation of a symbolic variable corresponding to a portion of the instructions, symbolically executing the instructions with respect to the symbolic variable, determining a test case from the results of the symbolic execution including one or more commands to execute the instructions with a given value for the symbolic variable, determining one or more calls to an object-oriented-programming component in the commands, creating a new symbolic test driver including the calls based on the determined calls, and subsequently symbolically executing the new symbolic test driver.

In another embodiment, a system includes a computer readable medium including computer-executable instructions and one or more processors coupled to the computer readable medium and operable to read and execute the instructions. The one or more processors are operable when executing the instructions to determine instructions for a computing device to be evaluated, create a first symbolic test driver including one or more of the instructions to be evaluated and a designation of a symbolic variable corresponding to a portion of the instructions, symbolically execute the instructions with respect to the symbolic variable, determine a test case from the results of the symbolic execution including one or more commands to execute the instructions with a given value for the symbolic variable, determine one or more calls to an object-oriented-programming component in the commands, create a new symbolic test driver based on the determined calls and including the calls, and subsequently symbolically execute the new symbolic test driver.

In yet another embodiment, an article of manufacture includes a computer readable medium and computer-executable instructions carried on the computer readable medium. The instructions are readable by a processor. The instructions, when read and executed, cause the processor to determine instructions for a computing device to be evaluated, create a first symbolic test driver including one or more of the instructions to be evaluated and a designation of a symbolic variable corresponding to a portion of the instructions, symbolically execute the instructions with respect to the symbolic variable, determine a test case from the results of the symbolic execution including one or more commands to execute the instructions with a given value for the symbolic variable, determine one or more calls to an object-oriented-programming component in the commands, create a new symbolic test driver including the calls based on the determined calls, and subsequently symbolically execute the new symbolic test driver.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
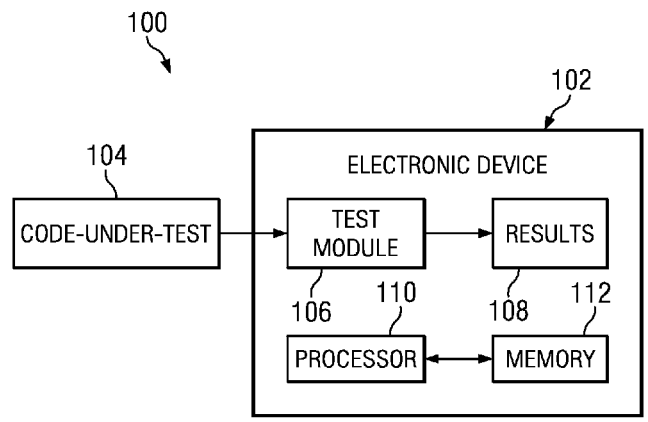
FIG. 1 is an example embodiment of a system for iterative generation of symbolic test drivers for object-oriented languages.

FIG. 1 is an example embodiment of a system 100 for iterative generation of symbolic test drivers for object-oriented languages. System 100 may be configured to verify, validate, or otherwise test code-under-test 104 and produce results 108 from such tests. During such tests, system 100 may be configured to iteratively generate symbolic test drivers for testing code-under-test 104. In one embodiment, such symbolic test drivers may be used by system 100 or another entity to symbolically execute code-under-test 104 as part of testing code-under-test 104. In another embodiment, system 100 may iteratively generate such symbolic test drivers based on object-oriented programming aspects of code-under-test 104. Such aspects may include, for example, calls to or instantiations of objects, classes, data structures or functions within objects.

System 100 may include an electronic device 102 configured to iteratively generate symbolic test drivers for code-under-test 104. Electronic device 102 may be further configured to symbolically execute code-under-test 104 using such symbolic test drivers, or to otherwise test code-under-test 104. In one embodiment, electronic device 102 may base the iterative generation of symbolic test drivers upon object-oriented programming aspects of code-under-test 104. Electronic device 102 may be configured to produce results 108 reflecting the results of testing code-under-test 104.

Electronic device 102 may be configured to receive code-under-test 104 in any suitable way such as, for example, electronically over a network, through loading or entering by a user, or accessing local or remote storage. Electronic device 102 may be configured to provide results 108 in any suitable way such as, for example, sending results 108 over a network, display to a user, or storing to a local or remote storage.

Electronic device 102 may include a test module 106 configured to iteratively generate symbolic test drivers for code-under-test 104. Further, test module 106 may be configured to perform any aspect of testing code-under-test 104 for electronic device 102 or system 100. Test module 106 may be implemented by any suitable mechanism, such as a program, software, software-as-service, analog or digital circuitry, or any combination thereof. Test module 106 may be resident on electronic device 102. Test module 106 may be implemented as a complete module, or as sub-module as part of a larger system. In software form, some or all of test module 106 may be implemented by, for example, logic, instructions, binaries, object code, libraries, functions, programs, applications, scripts, executables, or other suitable digital entity.

Electronic device 102 may include any device configurable to interpret and/or execute program instructions and/or process data, including but not limited to: a computer, desktop, server, laptop, personal data assistant, or smartphone. Electronic device 102 may include a processor 110 coupled to a memory 112. Some or all of test module 106 may be embodied in logic or instructions resident in memory 112 for execution by processor 110. Processor 110 may include, for example, a microprocessor, microcontroller, digital signal processor (DSP), application specific integrated circuit (ASIC), or any other digital or analog circuitry configured to interpret and/or execute program instructions and/or process data. Processor 110 may interpret and/or execute program instructions and/or process data stored in memory 112. Memory 112 may comprise any system, device, or apparatus configured to retain program instructions and/or data for a period of time (e.g., computer-readable media).

Code-under-test 104 may include, for example, software, software code, libraries, applications, scripts, active or passive web content, or other logic or instructions for execution upon an electronic device. In one embodiment, code-under-test 104 may include a complete instance of such software. In another embodiment, code-under-test 104 may include a portion of such software.

Results 108 may be implemented by data, files, or any other suitable mechanism for portraying, storing, or otherwise indicating the result of the operation of test module 106. Results 108 may include, for example, symbolic test drivers iteratively generated by test module 106 or indications of errors in code-under-test 104 determined through symbolic execution.

In operation, test module 106 may be executing on electronic device 102. Test module 106 may be accessible to local or remote users. Code-under-test 104 may be provided to electronic device 102 and test module 106. Test module 106 may analyze code-under-test 104 to determine whether code-under-test-104 contains errors. Test module 106 may analyze code-under-test 104 through any suitable process. In one embodiment, test module 106 may iteratively generate symbolic test drivers for code-under-test 104. In a further embodiment, test module 106 may conduct such generation based on object-oriented programming aspects of code-under-test 104. In another embodiment, test module 106 may symbolically execute code-under-test 104. Such symbolic execution may be conducted using the iteratively generated symbolic test drivers. Test module 106 may produce results 108, containing, for example, the iteratively generated symbolic test drivers or the results of symbolically executing code-under-test 104 with the generated symbolic test drivers. Results 108 may be provided to a user, stored, or otherwise used to evaluate code-under-test 104.

Figure 2:
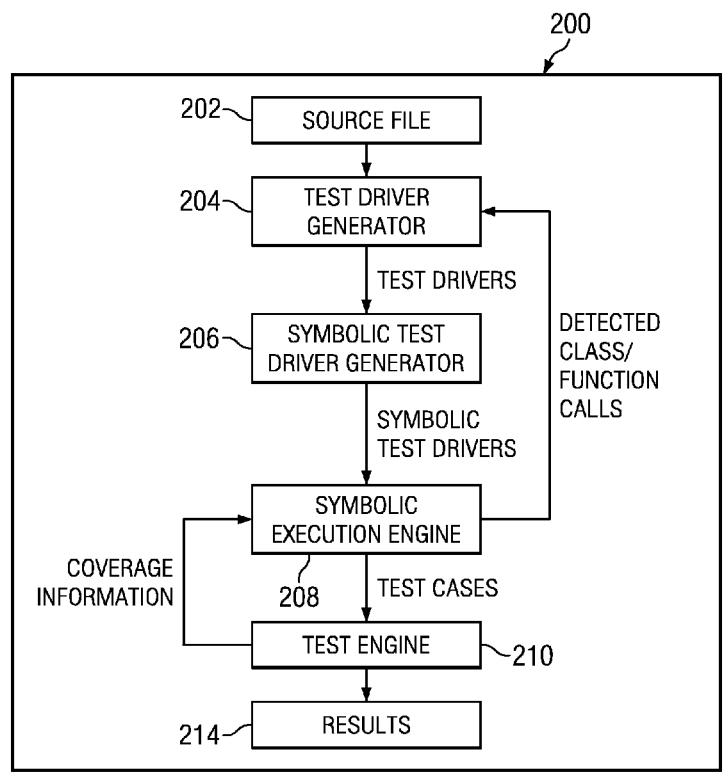
FIG. 2 is a more detailed view of an example embodiment and operation of a test module.

FIG. 2 is a more detailed view of an example embodiment and operation of a test module 200, which may implement fully or in part test module 106 of FIG. 1.

Test module 200 may include a test driver generator 204, symbolic test driver generator 106, symbolic execution engine 208, and test engine 210. Test driver 204 may be communicatively coupled to a source file 202, symbolic test driver generator 206, and symbolic execution engine 208. Symbolic test driver generator 206 may be further communicatively coupled to symbolic execution engine 208. Symbolic execution engine 208 may be further communicatively coupled to test engine 210, which may be configured to produce results 214.

Source file 202 may contain code that is to be evaluated, tested, or validated. Source file 202 may be implemented in, for example, a file, record, database, or any other suitable entity. Source file 202 may include, store, or implement code-under-test 104 from FIG. 1. Results 214 may be implemented in any suitable manner, and include results 108 from FIG. 1.

Test driver generator 204, symbolic test driver generator 206, symbolic execution engine 208, and test engine 210 may each be implemented in any suitable manner, such as a program, software, library, function, module, application, script, software-as-service, analog or digital circuitry, or any combination thereof. Although each of test driver generator 204, symbolic test driver generator 206, symbolic execution engine 208, and test engine 210 are shown as separate components, any of these may be combined with another component, shown or not shown, and still perform the functionality described herein. Test driver generator 204, symbolic test driver generator 206, symbolic execution engine 208, and test engine 210 may each implement some or all of test module 106 from FIG. 1. Test driver generator 204, symbolic test driver generator 206, symbolic execution engine 208, and test engine 210 may each be implemented in common or distinct modules, and such modules may be implemented as a complete module or as sub-module as part of a larger system. In software form, some or all of test driver generator 204, symbolic test driver generator 206, symbolic execution engine 208, and test engine 210 may be implemented by, for example, logic, instructions, binaries, object code, libraries, functions, programs, applications, scripts, executables, or other suitable digital entity.

Test driver generator 204 may be configured to receive code-under-test from source file 202. Such code-under-test may reflect a portion of a larger entity under analysis by test module 200. Further, test driver generator 204 may be configured to receive specified portions of the code-under-test from symbolic execution engine 208. The specified portions may include identified calls to or instantiations of object-oriented-programming-related aspects of code-under-test such as calls to or instantiations of objects, classes, data structures or functions within objects. Test driver generator 204 may be configured to generate a series of instructions reflecting the portion of the code-under-test as defined by, for example, source file 202 or specified portions received from symbolic execution engine 208.

Test driver generator 204 may be configured to pass the generated series of instructions as a test driver to symbolic test driver generator 206. Symbolic test driver generator 206 may be configured to modify a given variable in the test driver, corresponding to a variable in the code-under-test, to indicate that the driver should execute symbolically with respect to the given variable. The result may include a symbolic test driver. Symbolic test driver generator 206 may be configured to pass the symbolic test driver to symbolic execution engine 208.

Symbolic execution engine 208 may be configured to symbolically execute the symbolic test driver. The symbolic execution may include a program verification technique that systematically explores the different paths in a program. Included in such systematic exploration may be sequences of particular function calls that form a given path. Symbolic execution engine 208 may be configured to symbolically execute the symbolic test driver, which reflects portions of the code-under-test, in any suitable manner, including by analyzing conditional branch points in an instruction sequence. The result of symbolically executing the symbolic test driver may include test cases to be executed by test engine 210. The test cases may include sequences of instructions, paralleling the code-under-test, with specified input variables. The test case may include sequences of functional calls and input vectors, or variable values, that form a particular path.

Multiple such test cases may be created given a conditional branch point, wherein one test case shows the execution given one possible outcome of the conditional branch, and another test case shows the execution given a different possible outcome of the conditional branch. Conditional branch operations may include, for example, if-then-else statements or conditional loops.

Further, multiple such test cases may be created using different possible values for the variables. The variables may be limited by constraints specified, for example, by the design of the code-under-test or derived through symbolic execution. The constraints may include equations or logical conditions. Execution of the test cases may or may not be possible under such constraints. The constraints may be included in the test cases and provided to test engine 210.

Test engine 210 may be configured to execute the test cases and evaluate whether the results in view of the constraints indicate errors in the code-under-test. If the results of executing the test cases violate the constraints, then test engine 210 may be configured to determine that an error exists in the code-under-test represented by the test cases. If the results of executing the test cases do not violate the constraints, then test engine 210 may be configured to validate the code-under-test represented by the test cases, at least given the existing constraints. Test engine 210 may be configured to reexamine test cases representing code-under-test in view of new constraints as they are determined by, for example, symbolic execution engine 208. After evaluating the test cases, test engine 210 may be configured to notify symbolic execution engine 208 of whether to continue symbolically executing the code-under-test. Test engine 210 may be configured to make such a determination through any suitable mechanism, such as determining whether a certain amount of test coverage has been performed, or a certain limit of resources (such as iterations or time) have been expended. After determining whether a test or resource boundary has been met, test engine 210 may be configured to inform symbolic execution engine 208 of whether to stop or to continue to evaluate the code-under-test. Test engine 210 may be configured to produce results 214.

In some cases, test engine 210 may be configured to evaluate the sequences of function calls to determine whether any given function call violates a software design principle, such as initialization or use of a class by an unauthorized entity. In other cases, test engine 210 may be configured to evaluate the sequences of function calls that may indicate a malware attack. In still yet other cases, test engine 210 may be configured to evaluate whether sequences of function calls are unreachable during execution, such that the function calls cannot ever be executed.

Symbolic execution may be applied by symbolic execution engine 208 to variables in the code-under-test in symbolic test drivers. To reach a given variable, branch, or other point to be symbolically executed, particular sequences of instructions may need to be executed. Symbolic execution engine 208 may perform symbolic execution efficiently and effectively on primitive data types in such sequences of instructions. Primitive data types may include data types native and defined by the programming language, such as integers, characters, floating-point numbers, or Booleans.

However, in some cases symbolic execution engine 208 may not easily or efficiently perform symbolic execution on calls to or instantiations of object-oriented-programming components in such sequences of instructions. The components may include user-defined objects, structures, classes, or functions of such objects, structures, or classes. Such components may be defined by the programmer, be non-native, and contain any number of sub-components or hidden branch operations. Further, a full understanding of the possible range of execution of an object-oriented-programming component in a sequence of instructions may not be readily apparent, given that its actual data type may be obscured within the object, class, or structure. This is in contrast to the range or data type of, for example, a Boolean or integer, which is readily apparent to symbolic execution engine 208.

Consequently, direct symbolic execution of such a component may be unpredictable. A choice of given values within a test case applied to calls or instantiations of objects may not fully explore the sequence of instructions. Further, simply creating a full range of test cases for all possible values of the object-oriented-programming component may not be possible, as the symbolic execution engine may have no mechanism for evaluating the inner workings of the object-oriented-programming component. In addition, creating a full range of test cases for all possible values is likely to explore object values which are not possible within any legal execution of the program. That is, some of the values may not represent actual cases that the program would ever be able to generate. Evaluation of such values may trigger false positive bugs, which may have to be removed manually by a test engineer from the resulting test suites.

Thus, symbolic execution engine 208 may be configured to determine whether to create additional test drivers by analyzing the contents of, for example, the symbolic test drivers or test cases. In one embodiment, symbolic execution engine 208 may be configured to analyze the output test cases to determine whether the test cases contain any sequences with calls to or instantiations of an object-oriented-programming component. If so, symbolic execution engine 208 may be configured to identify the sequence in the test case for a new test driver to be created by test driver generator 204. The new test driver will be configured to symbolically execute the sequence of instructions including the calls to or instantiations of the object-oriented-programming component. Symbolic execution engine 208 may communicate such detected sequences including, for example, class or function calls, to test driver generator 204.

For a given branch point in a symbolic test driver, symbolic execution engine 208 may be configured to generate two or more test cases reflecting the execution of each branch. Symbolic execution engine 208 may evaluate the sequence of operations in each such resulting test case as a possible candidate for creating a new test driver.

For a given variable in a symbolic test driver used to call or instantiate an object-oriented-programming component, a test case may contain an assigned value for the variable. Symbolic execution engine 208 may be configured to identify such a variable in the symbolic test driver or assigned value in the test case. Based on such identification, symbolic execution engine 208 may be configured to indicate to test driver generator 204 that the variable is to be symbolically executed in the new test driver. In one embodiment, test driver generator 204 may perform such analysis based on test cases received from symbolic execution engine 208.

By creating additional test drivers for sequences of calls to or instantiations of object-oriented-programming components, symbolic execution engine 208 may fully explore the execution of such object-oriented-programming components.

Test driver generator 204 may be configured to create additional test drivers based upon the determinations sent by symbolic execution engine 208 or upon its own similar analysis. Symbolic test driver generator 206 may be configured to convert the test drivers into symbolic test drivers and send them to symbolic execution engine 208. Symbolic execution engine 208 may in turn symbolically execute the new symbolic test drivers.

Figure 3:
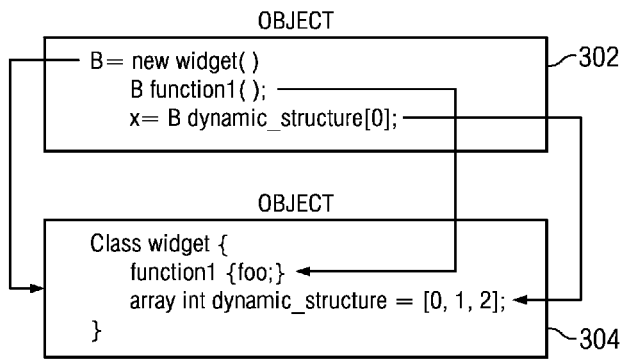
FIG. 3 is an illustration of example calls to or instantiations of objects, classes, data structures or functions for which new test drivers may be created.

FIG. 3 is an illustration of example calls to or instantiations of objects, classes, data structures or functions for which new test drivers may be created. A code sequence 302 may include any number or type of calls to or instantiations of an object-oriented-programming component 304. In one embodiment, code sequence 302 may be included in an object. In another embodiment, component 304 may be implemented by an object. Thus, calls may be made between objects. The objects containing code sequence 302 and component 304 may be included in, for example, different portions of a software module or in different software modules.

Any suitable kind or number of calls to or instantiations of object-oriented-programming components may be used to create new test drivers. For example, code sequence 302 may include an operation creating an instance of component 304 with an instruction such as "B=new widget( )," where B is a newly created instantiation of an object of the class widget. In another example, code sequence 302 may contain an operation accessing a function of component 304 with an instruction such as "B.function1( )," where "function1( )" is a function of the class "widget" of which B is an instance. In yet another example, code sequence 302 may contain an operation accessing a data structure of component 304 with an instruction such as "x=B.dynamic_structure[0]" where "dynamic_structure" is an integer array of the class widget in which B is an instance and the array consists of the set [0, 1, 2].

Any such calls, once identified as belonging to component 304, may be used to create a test driver to symbolically execute component 304. Such a test driver may include the instruction from code sequence 304, along with other instructions. The other instructions may include, for example, native-type operations, other calls to component 304, or calls to other object-oriented-programming components.

Figure 4:
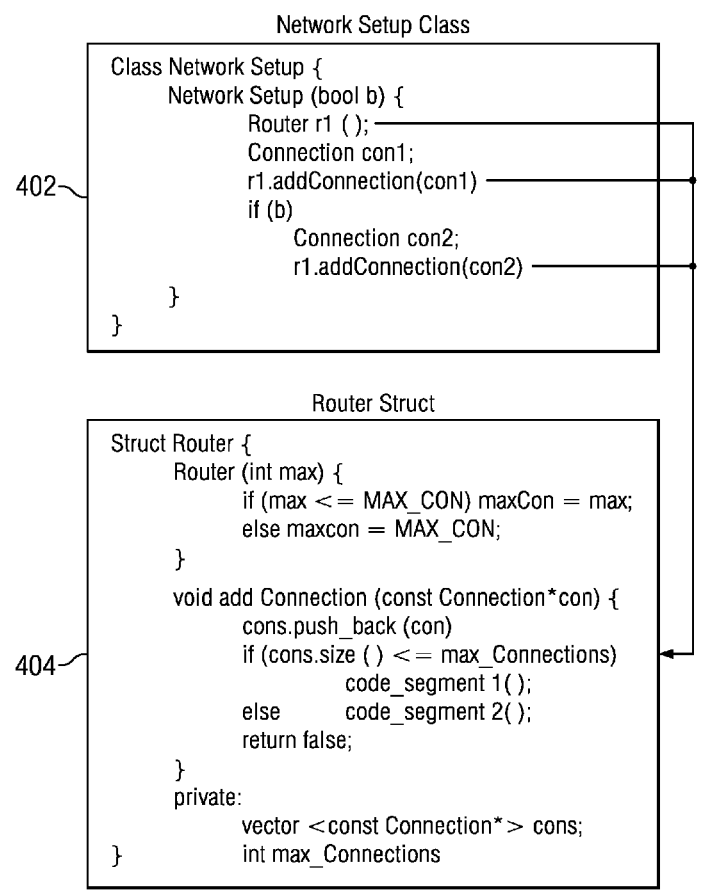
FIG. 4 is an example of code-under-test, which may cause symbolic test drivers to be iteratively generated.

FIG. 4 is an example of code-under-test that may cause symbolic test drivers to be iteratively generated in system 200. A class 402 called NetworkSetup and a structure 404 called Router may be contained with the code-under-test. Class 402 and structure 404 may both be object-oriented-programming components. Class 402 may contain various instructions, including both native-data-type operations (such as "if(b)"), calls to structure 404 (such as "Router r1( )" "r1.addConnection(con1)," or "r1.addConnection(con2)"), and creating instantiations of Router (such as "Router r1( )"). Class 402 may contain multiple such calls to structure 404.

Figure 5:
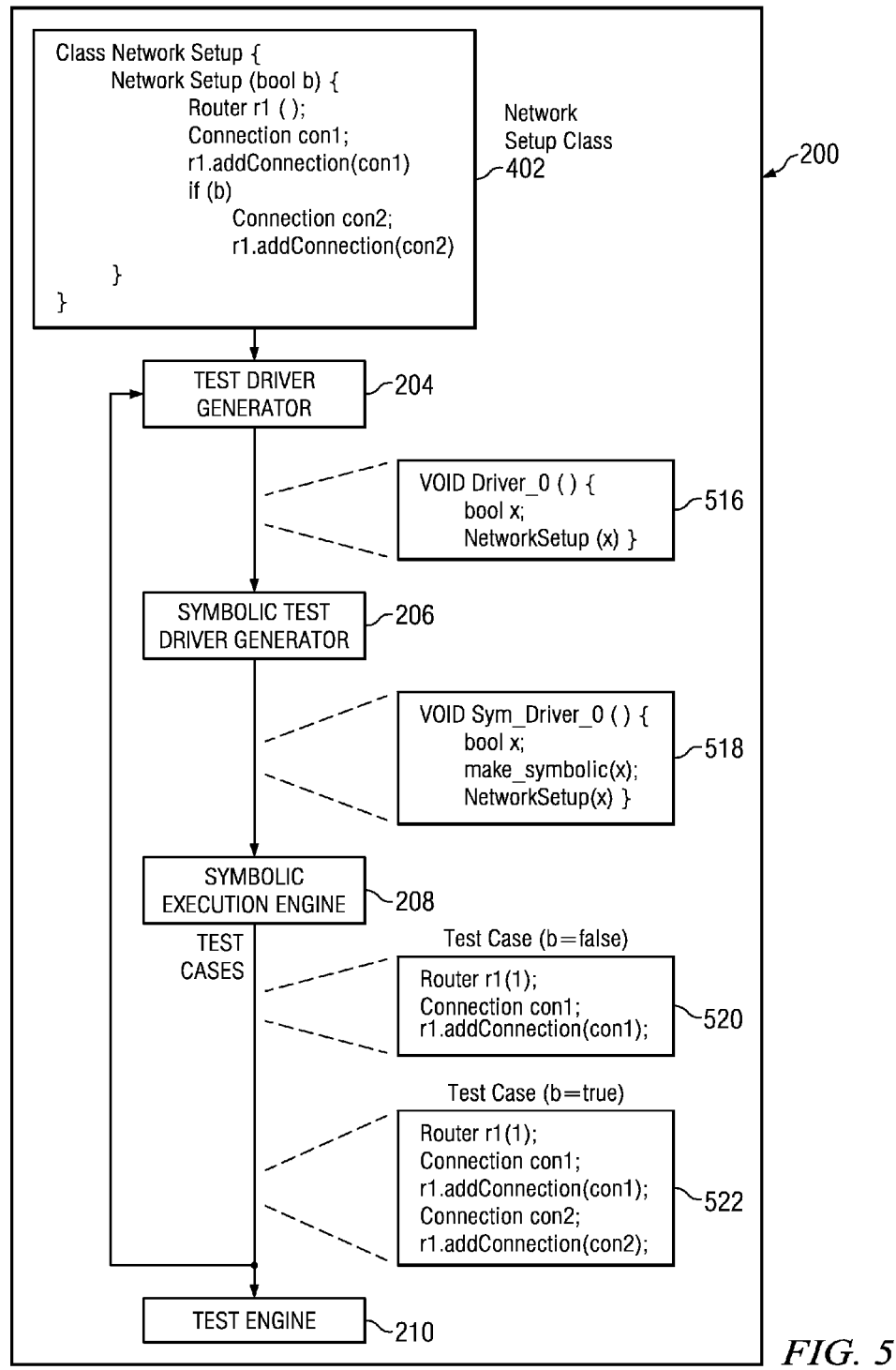
FIG. 5 is an illustration of example operation of the system.

FIG. 5 is an illustration of example operation of system 200. For example purposes, system 200 may use class 402 from FIG. 4.

Class 402 may be received by test driver generator 204. In order to evaluate class 402, test driver generator 204 may create an initial test driver 516. Test driver 516 may include instructions to call NetworkSetup of class 402 and to create a Boolean variable to pass to NetworkSetup. Test driver generator 402 may send test driver 516 to symbolic test driver generator 206.

Symbolic test driver generator 206 may convert test driver 516 into a symbolic test driver 518. Symbolic test driver 518 may include an instruction, "make_symbolic(x)" indicating that the variable x is to be symbolically executed. Symbolic test driver generator 206 may send symbolic test driver 518 to symbolic execution engine 208.

Symbolic execution engine 208 may symbolically execute symbolic test driver 518. Such symbolic execution may be performed based on the variable x as specified in symbolic test driver 518.

Symbolic execution engine 208 may evaluate the creation of an instance of class 402 through the calling of the NetworkSetup function. In the code for NetworkSetup is a conditional operation, "if(b)" wherein b is a Boolean and corresponds to the variable x to be symbolically executed. Symbolic execution engine 208 may then determine that there are two possible branches from the Boolean: one where b is true and one where b is false. Accordingly, symbolic execution engine 208 may create two instruction sequences reflecting each of the possible branches. Symbolic execution engine 208 may put the "false" instruction sequence in test case 520 and the "true" instruction sequence in test case 522. Further, symbolic execution engine 208 may provide test variable values to parameters of the instruction sequences. For example, the call to "Router r1" in both test cases 520, 522 may include a parameter of one. Symbolic execution engine 208 may send test cases 520, 522 to test engine 210 for execution.

Symbolic execution engine 208 may evaluate test cases 520, 522 to determine whether to generate test drivers based upon the sequences of instructions contained therein. Such evaluations of test cases 520, 522 may be made in tandem or separately. Symbolic execution engine 208 may determine that, in each test case 520, 522, calls are made from class 402 to structure 404. Further, symbolic execution engine 208 may determine that, in each test case 520, 522, a variable value of one was set for the function call "Router r1(1)." Consequently, symbolic execution engine 208 may cause test cases 520, 522 to be sent to test driver generator 204. Further, a variable for the parameter of "Router r1( )" may be designated to be symbolically executed.

Figure 6:
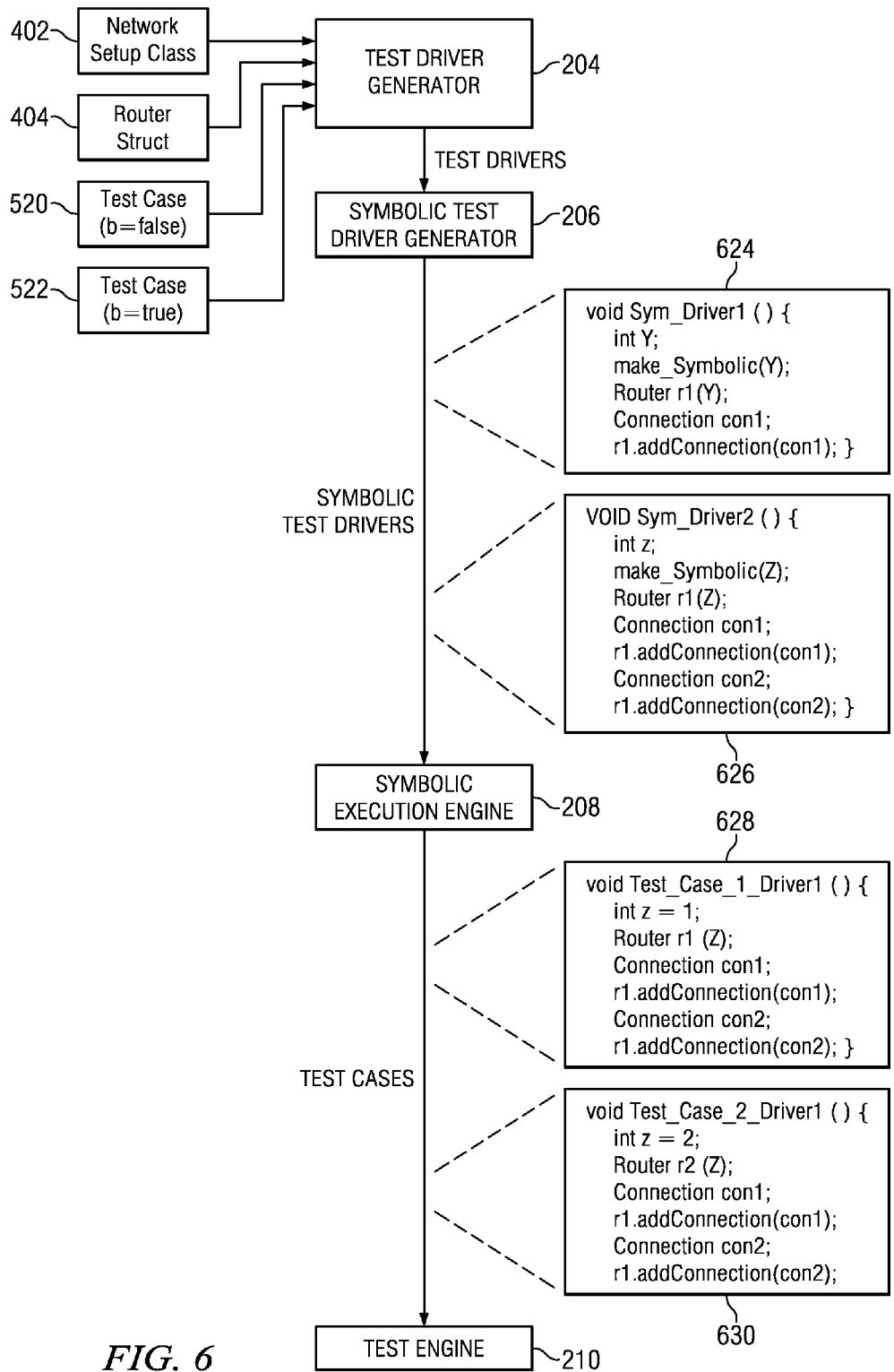
FIG. 6 illustrates further example operation of the system to generate new symbolic test drivers.

FIG. 6 illustrates further example operation of system 200 to generate new symbolic test drivers. Test driver generator 204 and symbolic test generator 206 may create new test drivers and symbolic test drivers based on test cases 520, 522.

Test driver generator 204 may utilize test cases 520, 522, class 402, and structure 404 to create test drivers to be sent to symbolic test driver generator 206. To determine what variables to make symbolic, symbolic test driver generator 206 may, for example, rely upon information observed by symbolic execution engine 208, determine branches in the accessed structure 404, or determine variables to use in test cases 520, 522. Symbolic test driver generator 206 may modify the test drivers to symbolically execute one or more variables and produce symbolic test driver 624 (based on test case 520) and symbolic test driver 626 (based on test case 520). Each of symbolic test drivers 624, 626 may contain an instantiation of a variable integer, and then an instruction to make the variable integer symbolic, in addition to the sequence of instructions contained in the respective one of test cases 520, 522.

Symbolic execution engine 208 may symbolically execute each of symbolic test drivers 624, 626. Symbolic execution engine 208 may produce one or more test cases for each such symbolic test driver 624, 626. Such test cases may reflect, for example, selected possible values for the symbolic variables. For example, symbolic execution engine 208 may create test cases 628 and 630 based on symbolic test driver 626. Test case 628 may include the sequence of instructions assuming that the integer variable symbolically executed is equal to one. Test case 630 may include the sequence of instructions assuming that the integer variable symbolically executed is equal to two. Symbolic execution engine 208 may similarly create test cases (not shown) based on symbolic test driver 624.

Test cases 628, 630 may be sent to test engine 210 for execution and evaluation. If boundary conditions have not been reached, then symbolic execution engine 208 may examine newly created test cases, such as test cases 628, 630, to determine whether their contents may provide the basis of additional generation of symbolic test drivers. If so, the test cases may be sent to test driver generator 204.

System 200 may repeat this process until code-under-test 104 is completely symbolically executed or until an execution boundary condition is detected.

Figure 7:
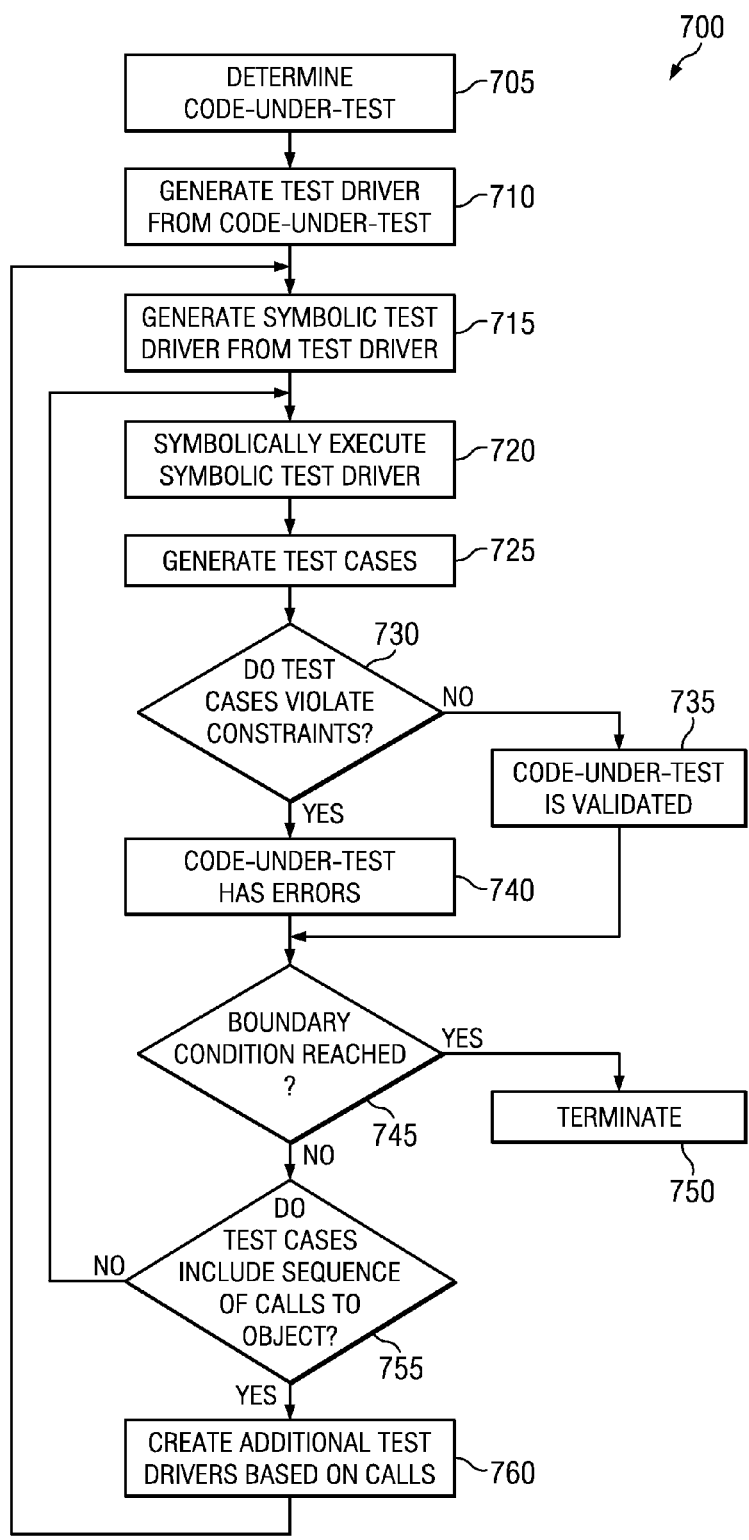
FIG. 7 is an illustration of an example method for iterative generation of symbolic test drivers for object-oriented languages.

FIG. 7 is an illustration of an example method 700 for iterative generation of symbolic test drivers for object-oriented languages. In step 705, code-under-test may be determined. The code-under-test may include all or a portion of software to be evaluated. Furthermore, the code-under-test may be created as an initialization of an instance of an object. The code-under-test may include sequences of instructions received from the execution of another instance of method 700.

In step 710, a test driver may be generated from the code-under-test. The test driver may include sequences or operations to be executed by the code-under-test and are to be evaluated. The test driver may initialize the code-under-test for evaluation.

In step 715, a symbolic test driver may be generated from the test driver. The symbolic test driver may include an indication of a variable for which the code-under-test is to be symbolically executed. In step 720, the code-under-test may be symbolically executed with respect to the identified variable. Symbolic execution may identify constraints, branch points, or other abstract conceptions of the code-under-test. The result of symbolic execution may include the generation of one or more test cases in step 725. The number of the test cases may include, for example, the number of branches within the code-under-test or the determined possible range of values of the identified variable. Test cases may be generated for each such branch and each such possible value.

In step 730, the test cases may be executed and it may be determined whether the test cases violate any constraints. If so, then in step 740 the code-under-test may be determined to have errors. If not, then in step 735 the code-under-test may be validated, at least with respect to the test cases covered thus far.

In step 745, it may be determined whether a boundary condition has been reached. Such a boundary condition may be defined by, for example, a range or number of test cases and test coverage, a number of iterations, a depth of symbolic execution, or time. If the boundary condition has been reached, then in step 750 the method 700 may terminate.

If the boundary condition has not been reached, then in step 755 it may be determined whether the test cases include sequences of calls to another object or similar component. Such calls may include instantiations of objects, access of an object's function, or access to an object's data structures. If so, then additional test drivers may be created based on the calls. The additional test drivers may include a sequence of instructions calling on the object. Method 700 may then proceed to repeat, evaluating the test drivers beginning at step 715. If not, then method 700 may return to step 730 to continue symbolically executing the symbolic test driver.

Although FIG. 7 discloses a particular number of steps to be taken with respect to example method 700, method 700 may be executed with more or fewer steps than those depicted in FIG. 7. In addition, although FIG. 7 discloses a certain order of steps to be taken with respect to method 700, the steps comprising method 700 may be completed in any suitable order. Further, various steps of 700 may be conducted in parallel with each other. For example, after determining in step 755 that a test case includes a sequence of calls to the object, method 700 may proceed to step 760 and in parallel return to execution of step 720.

Method 700 may be implemented using the system of FIGS. 1-6 or any other system, network, or device operable to implement method 700. In certain embodiments, method 700 may be implemented partially or fully in software embodied in computer-readable media. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure.

What is claimed is:

1. A method comprising, by one or more computing devices:
   determining instructions for a computing device to be evaluated;
   creating a first symbolic test driver including one or more of the instructions to be evaluated and a designation of a symbolic variable corresponding to a portion of the instructions;
   symbolically executing the instructions with respect to the symbolic variable;
   from the results of the symbolic execution, determining a test case including one or more commands to execute the instructions with a given value for the symbolic variable;
   determining that one or more calls in the commands are made to an object-oriented-programming component;
   based on a determination of the calls to the object-oriented-programming component, creating a new symbolic test driver including the determined calls; and
   subsequently symbolically executing the new symbolic test driver.

2. The method of claim 1, further comprising repeating the creation of new symbolic test drivers based on symbolic execution of a previously created symbolic test driver until a boundary condition is determined.

3. The method of claim 1, wherein determining instructions for a computing device to be evaluated includes creating an instance of an obj ect-oriented-programming class, wherein the instructions to be evaluated are included in the class.

4. The method of claim 1, further comprising selecting a new symbolic variable based on a value specified in the test case.

5. The method of claim 1, wherein the one or more calls to the object-oriented-programming component include a creation of an instance of the object-oriented-programming component.

6. The method of claim 1, wherein the one or more calls to the object-oriented-programming component include a call to a function of the object-oriented-programming component.

7. The method of claim 1, wherein the one or more calls to the object-oriented-programming component include an access of a data structure of the object-oriented-programming component.

8. A system comprising:
a computer readable medium comprising computer-executable instructions; and
one or more processors coupled to the computer readable medium and operable to read and execute the instructions, the one or more processors being operable when executing the instructions to:
determine instructions for a computing device to be evaluated;
create a first symbolic test driver including one or more of the instructions to be evaluated and a designation of a symbolic variable corresponding to a portion of the instructions;
symbolically execute the instructions with respect to the symbolic variable;
from the results of the symbolic execution, determine a test case including one or more commands to execute the instructions with a given value for the symbolic variable;
determine that one or more calls in the commands are made to an object-oriented-programming component;
based on a determination of the calls to the object-oriented-programming component, create a new symbolic test driver including the determined calls; and
subsequently symbolically execute the new symbolic test driver.

9. The system of claim 8, wherein the one or more processors are further operable to repeat the creation of new symbolic test drivers based on symbolic execution of a previously created symbolic test driver until a boundary condition is determined.

10. The system of claim 8, wherein determining instructions for a computing device to be evaluated includes creating an instance of an object-oriented-programming class, wherein the instructions to be evaluated are included in the class.

11. The system of claim 8, wherein the one or more processors are further operable to select a new symbolic variable based on a value specified in the test case.

12. The system of claim 8, wherein the one or more calls to the object-oriented-programming component include a creation of an instance of the object-oriented-programming component.

13. The system of claim 8, wherein the one or more calls to the object-oriented-programming component include a call to a function of the object-oriented-programming component.

14. The system of claim 8, wherein the one or more calls to the object-oriented-programming component include an access of a data structure of the object-oriented-programming component.

15. An article of manufacture comprising:
a computer readable medium; and
computer-executable instructions carried on the computer readable medium, the instructions readable by a processor, the instructions, when read and executed, for causing the processor to:
determine instructions for a computing device to be evaluated;
create a first symbolic test driver including one or more of the instructions to be evaluated and a designation of a symbolic variable corresponding to a portion of the instructions;
symbolically execute the instructions with respect to the symbolic variable;
from the results of the symbolic execution, determine a test case including one or more commands to execute the instructions with a given value for the symbolic variable;
determine that one or more calls in the commands are made to an object-oriented-programming component;
based on a determination of the calls to the object-oriented-programming component, create a new symbolic test driver including the determined calls; and
subsequently symbolically execute the new symbolic test driver.

16. The article of claim 15, wherein the processor is further caused to repeat the creation of new symbolic test drivers based on symbolic execution of a previously created symbolic test driver until a boundary condition is determined.

17. The article of claim 15, wherein determining instructions for a computing device to be evaluated includes creating an instance of an object-oriented-programming class, wherein the instructions to be evaluated are included in the class.

18. The article of claim 15, wherein the processor is further caused to select a new symbolic variable based on a value specified in the test case.

19. The article of claim 15, wherein the one or more calls to the object-oriented-programming component include a creation of an instance of the object-oriented-programming component.

20. The article of claim 15, wherein the one or more calls to the object-oriented-programming component include a call to a function of the object-oriented-programming component.

* * * * *

UNITED STATES PATENT AND TRADEMARK OFFICE
CERTIFICATE OF CORRECTION

PATENT NO.       : 9,058,427 B2
APPLICATION NO.  : 13/549785
DATED            : June 16, 2015
INVENTOR(S)      : Maarten Wiggers et al.

It is certified that error appears in the above-identified patent and that said Letters Patent is hereby corrected as shown below:

In the claims:

Column 11, Line 7: After "an instance of an" and before "class" delete "obj ect-oriented-programming" and insert --object-oriented-programming--.

Signed and Sealed this
Fifth Day of July, 2016

Michelle K. Lee
*Director of the United States Patent and Trademark Office*